United States Patent
Ekambaram et al.

(10) Patent No.: US 10,665,123 B2
(45) Date of Patent: May 26, 2020

(54) SMART EXAMINATION EVALUATION BASED ON RUN TIME CHALLENGE RESPONSE BACKED BY GUESS DETECTION

(71) Applicant: International Business Machines Corporation, Armonk, NY (US)

(72) Inventors: Vijay Ekambaram, Chennai (IN); Vikas Joshi, Bangalore (IN); Samiulla Zakir Hussain Shaikh, Ahmednagar (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 236 days.

(21) Appl. No.: 15/619,117

(22) Filed: Jun. 9, 2017

(65) Prior Publication Data

US 2018/0357917 A1    Dec. 13, 2018

(51) Int. Cl.
*G09B 7/08* (2006.01)
*G09B 7/02* (2006.01)

(52) U.S. Cl.
CPC ....... *G09B 7/08* (2013.01); *G09B 7/02* (2013.01)

(58) Field of Classification Search
CPC ........................................................ G09B 7/08
USPC ......................................................... 434/350
See application file for complete search history.

(56) References Cited

U.S. PATENT DOCUMENTS

| | | |
|---|---|---|
| 6,181,909 B1 | 1/2001 | Burstein et al. |
| 7,286,793 B1 | 10/2007 | Miele |
| 8,834,166 B1* | 9/2014 | Ionkov ............... G09B 17/00 434/178 |
| 2008/0126319 A1 | 5/2008 | Bukai et al. |
| 2012/0208166 A1 | 8/2012 | Ernst et al. |

(Continued)

OTHER PUBLICATIONS

Darya Tarasowa et al., "Balanced Scoring Method for Multiple-mark Questions", Proceedings of the 5th International Conference on Computer Supported Education (CSEDU), May 6-8, 2013, Aachen, Germany, 6 pages, Science and Technology Publications, Lda (SCITEPRESS), Setubal, Portugal.

(Continued)

*Primary Examiner* — Kesha Frisby
(74) *Attorney, Agent, or Firm* — Ference & Associates LLC (57) ABSTRACT

One embodiment provides a method, including: obtaining a first question on a multiple choice exam comprising a plurality of possible answers; receiving his or her answer selection of one of the plurality of possible answers; identifying an answer time corresponding to the amount of time between presentation of the question and receiving the answer selection; determining if the test taker is guessing the answer to the question, wherein the determining comprises (i) comparing the answer time to a predetermined threshold answer time and (ii) ascertaining that the test taker is guessing when the answer time is outside the threshold answer time; providing to the test taker one or more additional questions, wherein the one or more additional questions are related to the first question; and evaluating the test taker using at least one of: the answer selection and any test taker response to the one or more additional questions.

20 Claims, 3 Drawing Sheets

(56) References Cited

U.S. PATENT DOCUMENTS

2015/0348433 A1 12/2015 Gatterbauer et al.

OTHER PUBLICATIONS

Scharf, Eric M. et al., "Assessing multiple choice question (MCQ) tests—a mathematical perspective", Active Learning in Higher Education, 2007, 18 pages, Open Access Repository, SSOAR, www.ssoar.info.

* cited by examiner

SMART EXAMINATION EVALUATION BASED ON RUN TIME CHALLENGE RESPONSE BACKED BY GUESS DETECTION

BACKGROUND

Examinations are used to determine a test taker's knowledge of a subject matter. Many types of examinations are used, for example, short answer, essay answer, multiple choice questions, and the like. Essay-style questions or other questions that require the test taker to provide a detailed response offer the benefit of allowing the exam grader to determine how much of the material the test taker comprehends. However, detailed response questions are very labor intensive for a grader. For example, essay questions require more grading time and place a burden upon the grader to determine point values for individual components of the essay. Therefore, multiple choice exams remain a popular choice for examination style. A multiple choice exam may be graded quickly, often by a machine, and serve as an objective measure of the test takers knowledge of the tested subject matter. However, a multiple choice exam does not allow for an analysis of how the test taker arrived at the selected answer.

BRIEF SUMMARY

In summary, one aspect of the invention provides a method, comprising: utilizing at least one processor to execute computer code that performs the steps of: obtaining a first question on a multiple choice exam, wherein the first question comprises a plurality of possible answers; receiving, from a test taker, his or her answer selection of one of the plurality of possible answers; identifying an answer time corresponding to the amount of time between presentation of the question and receiving the answer selection; determining if the test taker is guessing the answer to the question, wherein the determining comprises (i) comparing the answer time to a predetermined threshold answer time and (ii) ascertaining that the test taker is guessing when the answer time is outside the threshold answer time; providing to the test taker, based upon the determining, one or more additional questions, wherein the one or more additional questions are related to the first question; and evaluating the test taker using at least one of: the answer selection and any test taker response to the one or more additional questions.

Another aspect of the invention provides an apparatus, comprising: at least one processor; and a computer readable storage medium having computer readable program code embodied therewith and executable by the at least one processor, the computer readable program code comprising: computer readable program code that utilizes at least one processor to execute computer code that performs the steps of: computer readable program code that obtains a first question on a multiple choice exam, wherein the first question comprises a plurality of possible answers; computer readable program code that receives, from a test taker, his or her answer selection of one of the plurality of possible answers; computer readable program code that identifies an answer time corresponding to the amount of time between presentation of the question and receiving the answer selection; computer readable program code that determines if the test taker is guessing the answer to the question, wherein the determining comprises (i) comparing the answer time to a predetermined threshold answer time and (ii) ascertaining that the test taker is guessing when the answer time is outside the threshold answer time; computer readable program code that provides to the test taker, based upon the determining, one or more additional questions, wherein the one or more additional questions are related to the first question; and computer readable program code that evaluates the test taker using at least one of: the answer selection and any test taker response to the one or more additional questions.

An additional aspect of the invention provides a computer program product, comprising: a computer readable storage medium having computer readable program code embodied therewith, the computer readable program code executable by a processor and comprising: computer readable program code that utilizes at least one processor to execute computer code that performs the steps of: computer readable program code that obtains a first question on a multiple choice exam, wherein the first question comprises a plurality of possible answers; computer readable program code that receives, from a test taker, his or her answer selection of one of the plurality of possible answers; computer readable program code that identifies an answer time corresponding to the amount of time between presentation of the question and receiving the answer selection; computer readable program code that determines if the test taker is guessing the answer to the question, wherein the determining comprises (i) comparing the answer time to a predetermined threshold answer time and (ii) ascertaining that the test taker is guessing when the answer time is outside the threshold answer time; computer readable program code that provides to the test taker, based upon the determining, one or more additional questions, wherein the one or more additional questions are related to the first question; and computer readable program code that evaluates the test taker using at least one of: the answer selection and any test taker response to the one or more additional questions.

A further aspect of the invention provides method comprising: utilizing at least one processor to execute computer code that performs the steps of: receiving a question from a multiple choice exam having a plurality of possible answers; identifying an answer selected by a test taker for the question and measuring the time it takes for the test taker to answer the question after presentation of the question; determining, by comparing the time to a predetermined threshold time, whether to query the test taker with at least one additional question related to the question; prompting, based upon the answer time being outside the predetermined threshold, the test taker with the at least one additional question; and evaluating the test taker, wherein the evaluating the test taker comprises evaluating the selected answer and a response provided by the test taker to the at least one additional question.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Using a multiple choice exam for evaluation of a test taker's knowledge of subject matter is very common. The terms test taker, examinee, candidate, or the like may be used interchangeably in the description herein. Traditionally, a test taker is given a question in text form and is presented with a set of possible answers, for example, on a "bubble sheet", within a test booklet, on the test, or the like. Once a test taker selects an answer a grader, computerized system, or the like, compares the selected answer to the correct answer. The examinee's score may then be calculated as a percentage of correct answer selections from the total pool of presented questions. Some tests do provide for a "penalty" for selecting a wrong answer by deducting a point value from the score for each wrong answer. However, many tests do not employ this penalty method. Accordingly, even if an examinee guesses, the examinee receives full credit for a correct answer.

Traditional systems do not provide a method or technique for identifying when an examinee guesses on a traditional multiple choice exam. At best, a traditional system may be able to identify if an examinee marked one answer, erased that answer, and marked a different answer. However, the system cannot determine if this changing of the answer was from guessing or based upon another reason. In other words, traditional multiple choice tests do not provide a technique to determine if the candidate actually fully understood the concept, made some educated guess based upon a partial understanding of the material, or that the candidate simply made a random guess and happened to select the correct answer.

Additionally, traditional multiple choice test evaluation systems do not provide for a technique for determining a reason for selection of a wrong answer. Reasons for selecting a wrong answer may include the examinee understanding the concept but selecting the wrong answer, a candidate making a random guess and selecting the wrong answer, and the like. In other words, the candidate may know the material, but make a mistake and select the wrong answer, which cannot be determined using conventional techniques. Selection of the wrong answer may simply be that the candidate accidentally selected the wrong answer, even while knowing the right answer, or the candidate may understand the concept but made a mistake when working the problem that results in the wrong answer. Alternatively, the candidate may make an educated guess based on a partial understanding of the material, but still select the wrong answer.

Accordingly, an embodiment provides a method of determining if the test taker is guessing the answer to a question on a multiple choice test. The system may obtain a question included on a multiple choice exam. The exam may also include a plurality of possible answers that can be selected by the examinee. For example, a test taker may be presented with a question having four possible answers that can be selected by the test taker. When the test taker selects an answer to the question, the system identifies an answer time, which is the time it took for the test taker to select an answer after presentation of the question. To determine if the test taker might be guessing, the system compares the answer time to a predetermined threshold answer time. If the answer time is outside a threshold answer time, either above or below, the system may identify a possibility of guessing. The system may also assign a confidence score to the possibility of guessing. In other words, the system may identify how confident it is that the student is guessing.

If the system identifies a possibility of guessing, the system may provide the test taker with one or more additional questions. The provision of the one or more additional questions may be based upon the confidence score that the system assigned to the possibility of guessing. For example, the system may not provide additional questions if the confidence score is below a particular threshold value. As another example, the system may provide different questions based upon the confidence score. If the confidence score is within one range, the system may provide an additional question that requires a high-level understanding of the concept related to the original question, for example, identifying the concept tested. However, if the confidence score is within a different range, for example, the system is more confident that the student is guessing, the system may provide an additional question that requires the test taker to provide more detail, for example, to provide an answer related to a step for solving the problem, to show the work needed to solve the problem, provide more explanation for reaching an answer, and the like. The system may then evaluate the test taker using the selected answer, the answer to the one or more additional questions, or a combination of both.

Thus, the systems and methods as described herein provide a hybrid approach which uses both objective and subjective criteria to evaluate a candidate. Accordingly, the systems and methods as described herein overcome the problems found in the traditional approaches, e.g., multiple-choice exams vs. detailed response exams. Traditional multiple choice exams may be quickly graded, but they do not produce an understanding of how much of a concept a test taker understands. Detailed response exams require longer to evaluate, but provide a method for testing the comprehension of the test taker. Accordingly, the system combines the multiple choice exam approach with the detailed exam approach by providing an enhanced multiple choice exam. When the system detects that the test taker is guessing, the system may provide additional follow up questions or required analysis.

Such a method and system provide a technical improvement over current systems for detecting guessing on multiple choice exams. Using the systems and methods as described herein, parameters, which may include useful information related to examinee guessing, may be mined to assist in the identification of the guessing. The examinee can then be presented with additional questions if the system detects possible guessing. Accordingly, the methods and system described herein provide a way to detect guessing on a multiple choice exam. Therefore, as opposed to current multiple choice exams, the systems and methods as described herein provide a technique for detecting examinee guessing that is not possible with conventional systems which cannot detect guessing. Additionally, the systems and methods and described herein provide a technique for using multiple choice tests that allow the evaluator to determine if the examinee actually understands the concepts tested on the exam, whereas conventional multiple choice exams do not allow such a determination.

Figure 1:
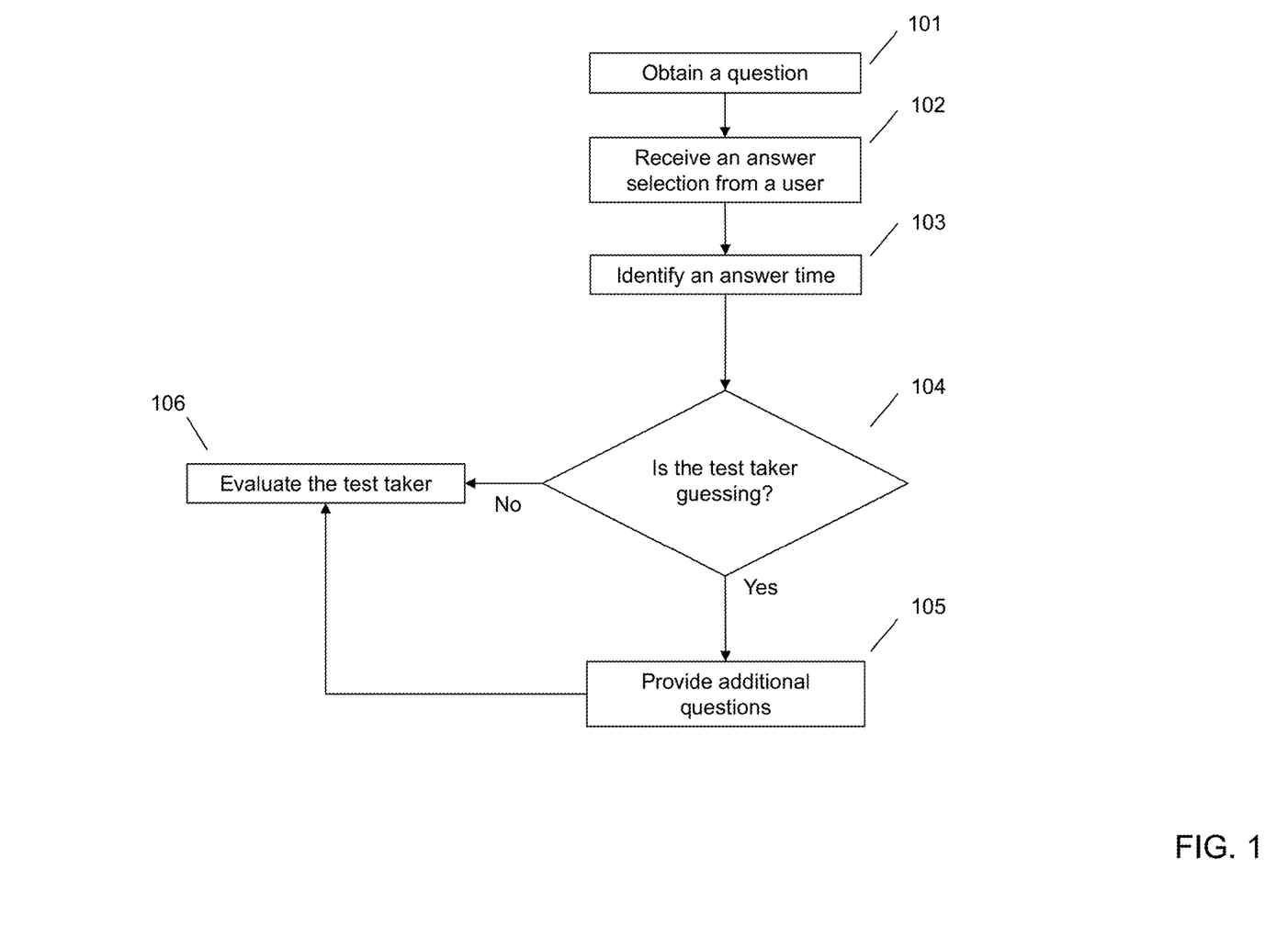
FIG. 1 illustrates a method of detecting a test taker guessing.
Figure 2:
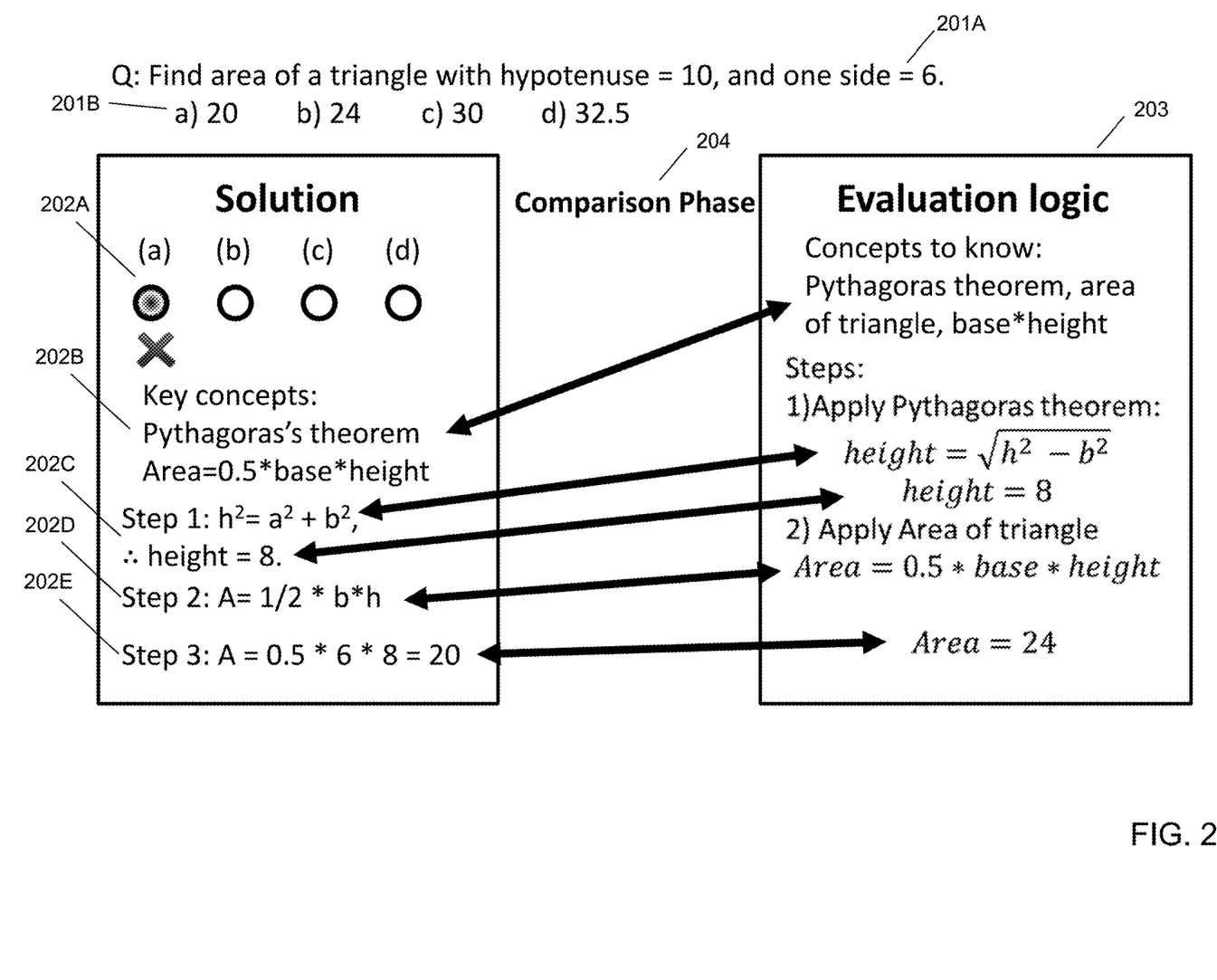
FIG. 2 illustrates an example of an analysis of answers on a test.

Referring now to FIG. 1, the system may obtain a question on a multiple choice exam and present the question to an examinee or candidate at 101. Obtaining a question may include a user, for example, an evaluator, loading or identifying the questions to be presented on the test. The system may also obtain the question by accessing a question bank stored in a data storage location (e.g., local data storage location, remote storage location, cloud storage location, etc.). In this case, the system may use rules or other identifiers to obtain the questions to be presented. For example, the question banks may be assigned to a particular test, and the system may access the question bank assigned to an identified test. As another example, the system may compare instructions or information included in the test (e.g., title, instructions, subject identifiers, etc.) to the questions stored in the question bank to obtain the applicable questions. Other methods for obtaining the questions are possible and contemplated.

The system may select the question to be presented using different methods. For example, the test questions may be preset, with the system selecting and presenting the question in order as preset. As another example, the system may scramble or randomize the order of the questions. This may be useful in an examination setting where it may be preferred that examinees receive questions in a different order than neighboring examinees. The system may also select or obtain a question or a set of questions from a bank of questions. For example, the system may have access to a hundred different questions for a particular subject matter and test, but the test has been identified as only presenting twenty of those questions. Accordingly, the system may select twenty questions out of the bank of a hundred questions to present to the examinee. Another way for obtaining and/or selecting a question may be based upon the performance of an examinee on the present or a prior exam. For example, harder questions may be presented to examinees who seem to be very familiar with the subject matter.

At 102, the system may receive an answer selection from the examinee or candidate. The answer selection may include the examinee selecting one of the possible answers included with the question, for example, by circling the selected answer, filling in the corresponding "bubble" on the "bubble sheet", or otherwise identifying an answer as the selection. Alternatively, the selection of an answer by a candidate may be provided using different inputs. These inputs may include, but are not limited to, touching the answer on a touchscreen, selecting the answer with an input device (such as a mouse, touchpad, keyboard, etc.), answering the question with audible input via an auditory input device such as a microphone, selecting the answer using the candidate's gaze such as with a virtual reality headset or the like, or any other form of input device associated with the test system. As an example, on a multiple choice exam, an examinee may be presented with a question and a set of possible answers. The correct answer is included as one of the possible answers, but in order to select the correct answer, ideally the examinee will go through the steps and thought process to identify the correct answer. After a question is presented, the examinee must read the question, perform mental logics, and select the correct answer.

At 103 the system may identify an answer time associated with the selection of the answer by the examinee. The answer time may include a value for an amount of time between presentation of the question and receipt of the answer selection. In other words, the answer time may be the time starting from when the candidate is presented with a question to when a candidate selects an answer. The answer time may include a single period of time or an aggregate of multiple periods of time. For example, the time period may be one period if a question is presented to a candidate and the candidate answers the question and does not return to the question. Alternatively, the answer time may be an aggregate of multiple periods of time, for example, if a user opens a question multiple times. For example, a question may be presented to a candidate and the candidate may decide to not answer the question and may return to the question at a later time. As another example, the candidate may answer a question and then return to the question to select another answer. A further example is when the candidate answers a question, returns to the question, but ends up keeping the first answer selected. All of the times that the examinee accesses the question may be recorded and then aggregated to determine the answer time.

At 104, the system may determine if the candidate is guessing the answer to the question. The possibility of guessing is also referred to herein as detection of an anomaly. Determining if the candidate is guessing the answer may include determining a probability or possibility that the candidate is guessing. For example, the system may not identify definitively if the candidate is guessing, rather, the system may only determine the likelihood that the candidate is guessing. If the likelihood is above a predetermined threshold, the system may then make the determination that the candidate is guessing the answer. Making the determination that the candidate is guessing may include comparing the answer time to a predetermined or threshold answer time. The predetermined or threshold answer time will be referred to herein as the comparison answer time for ease of readability. The comparison answer time may be a particular time (e.g., five seconds, ten seconds, thirty seconds, a minute, etc.) or time range (e.g., between five and seven seconds, between sixty and ninety seconds, etc.).

Each question may have a different comparison answer time. In other words, the time to answer a question may be different for different questions. For example, a longer question, as measured by word count, may require a longer time for response due to the fact that reading the question takes longer. Similarly, a question with long answer choices may require a longer time to answer. As another example, more complex or difficult questions, for example, a question covering more difficult subject matter, may require a longer response time. As a further example, questions that require multiple steps to answer may require more answer time. For example, for a question covering mathematical subject matter, if the question requires more than one formula to answer a question, then the time to answer the question may be longer. Contrasting examples of the above examples may be true as well. For example, shorter or easier questions may require a shorter response time. Accordingly, the predetermined or threshold answer time may vary for different questions.

The comparison answer time may be generated or set by an evaluator. For example, the evaluator may determine the estimated or expected answer time or range and this may be used to generate the comparison answer time. The system may use crowd-sourcing to set the comparison answer time. For example, as candidates are taking the test, or previous candidates who have taken the test answer questions, the system may evaluate the time it took for these candidates to answer the question. The system may then analyze these answer times to generate a comparison answer time. Analyzing the answer times might include determining the average, identifying the high and low answer time values, determining the most common answer times, and the like.

Determining if the candidate is guessing may also be based upon the user's behavior pattern. The behavior pattern of the test taker may be generated using parameters related to answering questions on the exam, for example, answer time, the amount of rough work generated, amount of time taken to complete the rough work, and the like. The behavior pattern of the individual may be identified as the candidate is completing the exam, or it may be based upon previous exams of the candidate. The system may then compare the behavior pattern for the individual against behavior patterns of known test takers or groups, referred to herein as a reference group(s). The reference groups may be based upon behavioral analytics. For example, the examinees or candidates may be grouped based upon test performance or other criteria, for example, performance on an exam, the time to answer a question, the difficulty of presented questions, performance as compared to other individuals, performance as compared to other groups of test takers, performance as compared to the current group of test takers, and the like.

The behavior patterns of the reference group(s) may be identified before administration of the current exam. For example, the behavior patterns may be identified in a reference testing setting, for example, a setting specifically designed to create reference groups, or based upon previously presented exams, for example, the same exams presented for a previous class or group of candidates. The behavior patterns for the reference groups may be classified based upon the type of candidate or performance of the candidates. For example, the behavior patterns for candidates who are known to be poor test candidates (e.g., the candidates who generally perform poorly on exams, the candidates who are known for guessing, etc.) may be grouped. Similarly, the behavior patterns for candidates who are good test candidates may be grouped together. As can be understood by one skilled in the art, different group types and different numbers of groups may be used.

The system may also assign a pattern score to the reference group's behavior patterns. This pattern score may identify how confident the reference group candidates are when responding to each question. In other words, this pattern confidence score may indicate a likelihood that the reference candidate will select the correct answer. The system may also assign a pattern score to the target candidate. Once the system has the reference group behavior patterns, the system may compare the captured behavior pattern of the individual to the reference pattern for a particular question presented to the test taker. For example, the system may compare the behavior pattern of the individual to behavior patterns of the reference groups to determine which group the individual's behavior pattern most closely matches. As another example, the system may compare the pattern scores of the groups and the individual to choose the most representative group. Based upon the results of the comparison (e.g., which group the candidate is associated with), the system may make a determination of whether possible guessing is detected.

If the system determines that there is no possibility of guessing, or a very low possibility of guessing, the system may evaluate the candidate using the selected multiple choice answer only at 106. In other words, if the system determines that the possibility of guessing is below a particular threshold, the system may compare the selected multiple choice answer to the bank of known multiple choice answers and evaluate the candidate's response based solely on this selected answer. Accordingly, if no anomaly is detected, then the system may move to the next question of the exam.

If, however, the system determines a possibility of guessing is above a predetermined threshold, the system may present additional questions to the candidate at 105. In other words, if an anomaly or guessing is detected, the student may have to defend the answer selection. The additional questions may be related to the original question. For example, the additional questions may ask the candidate to identify the theory used to solve the original question, may require the user to provide additional answers that would be found during solving the original questions, and the like. The additional questions may include follow-up multiple choice questions or may require a more detailed explanation. For example, the question may require the candidate to show work, provide a short answer answering the additional question, provide a detailed explanation answering the additional question, or the like.

The system may also assign a confidence score to the determination of whether the candidate is guessing, or whether an anomaly has been detected. For example, the system may assign a confidence level of high, medium, low, 50%, 25%-30%, and the like, to the determination of whether the candidate is guessing. The selection of the one or more additional questions may be based upon the confidence score. For example, a higher confidence that the user is guessing may result in a more difficult or complex additional question, while a lower confidence may result in an easier or less complex additional question. As an example, using a mathematical question example, if the confidence score is high, the system may ask for a description or showing of work for solving the mathematical question. If the confidence score is average, the system may ask one more question such as, "What is the length of the third side of the triangle?" If the confidence score is low, the system may query the test taker for a selection of the theorem used to answer the question as selected from a list of other theorems.

The system may also use the candidate's answers to the additional questions to assist in making a determination of whether the candidate is guessing on subsequent questions. For example, the system may provide additional questions to the candidate for the first five questions based upon a possibility of guessing. However, the candidate may correctly answer all the additional questions. Therefore, the system may identify that even though the candidate may be answering questions outside the threshold range, the candidate is likely not guessing. This information may then be used to assist in making the determination regarding guessing for subsequent questions. The system may then evaluate the candidate based upon both the answer selection and the response to the one or more additional questions at 106. For example, the system may validate and evaluate scores for each of the exam questions by performing a weighted average of a user choice for the multiple choice questions and the responses for the challenge-based model.

Evaluating the examinee using the responses to the additional questions may include making a comparison of the candidate's responses to previously stored evaluation logic. For example, FIG. 2 illustrates an example of how the system may analyze an examinee response against evaluation logic. The question 201B is provided with four possible answers 201B. The user has selected answer (a) 202A which the system has determined is incorrect. Also, for the sake of this example, it is assumed that the system has identified with a high confidence that the candidate is guessing, so the system has provided an additional question (not shown) requesting that the candidate show how to solve the problem. Accordingly, the candidate has identified the key concepts 202B: Pythagoras's theorem and the formula for calculating area of a triangle. Additionally, the candidate has identified the steps for applying Pythagoras's theorem 202C, applying the area of the triangle concept 202D, and the answer 202E.

A comparison phase 204 compares the solution and rough work of the candidate to the evaluation logic 203, which may be provided by an evaluator. For example the comparison phase may compare key concepts, steps in arriving at an answer, results of steps, or any other step in the candidate's work the evaluator or test author may select. This approach may allow for a subjective evaluation of a candidate on a multiple choice exam. Each step or solution entered by the candidate may be compared against the exam author's expected result. If the candidate answer matches the expected step answer, then partial credit may be awarded. In this example, the system may identify that the candidate correctly matched the key concepts, correctly applied the concepts at steps 1 and 2, but arrived at the incorrect solution. Accordingly, the system may award partial credit to the test taker based upon the correctly answered additional questions.

The answers to the one or more additional questions may be provided as "rough work" which may be detected by the system while the test taker is answering the question. For example, the system may receive input from the test taker as the test taker uses an input device (e.g., smart pad, touch screen device, on a paper where a camera detects the writing, etc.) to write out the response to the one or more additional questions. A test taker may "show his or her work" on the input device. The input may be used by the system to determine how the test taker arrived upon the selected answer. In an embodiment, traditional scratch paper may be used by the test taker and may contain information in the form of work that contains how the test taker arrived at the selected answer. The image or writing on the scratch paper may be detected by a camera at the workstation, may be fed into optical character recognition (OCR) software, or the like.

The system may compare concepts, formulae, algorithms, results, and the like, from the candidate to an expected answer from the author of the question, for example, as discussed in connection with FIG. 2. For example, the candidate may enter rough work while taking the exam on a smart pad or scratch paper. Deep learning methods may be used for interpreting and comparing natural language descriptions for the rough work. For example, candidates may use different verbiage to describe an item, such as, the term area may be instead referred to as square inches or inches square, different mathematical concepts can be solved using different formulas, and the like. Accordingly, the system may use different techniques for detecting whether the terms, formulae, algorithms, and the like, are the same as those provided by the evaluator without the evaluator having to provide all possible answers or solutions.

Figure 3:
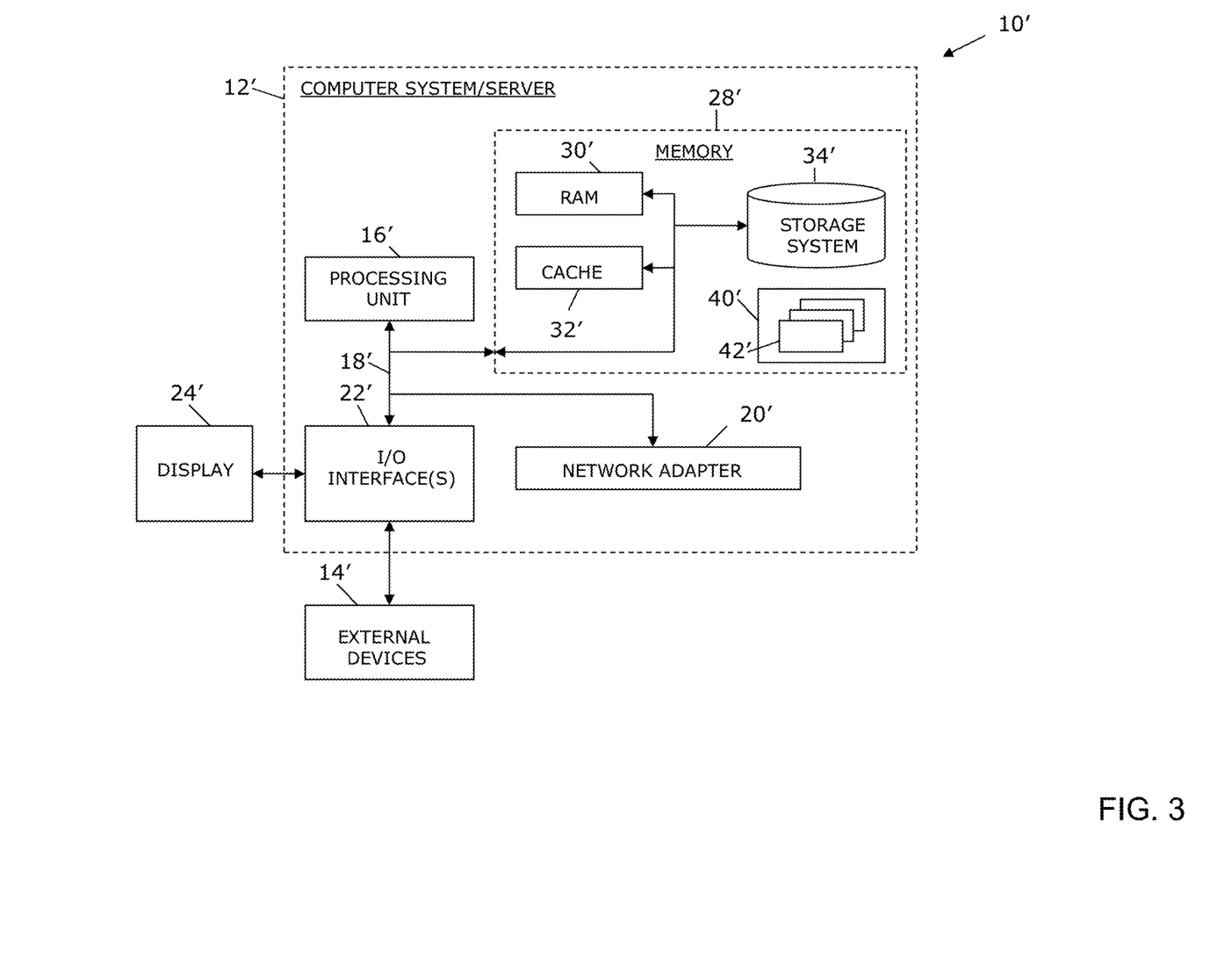
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA)

bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
obtaining a first question on a multiple choice exam, wherein the first question comprises a plurality of possible answers;
receiving, from a test taker, his or her answer selection of one of the plurality of possible answers;
identifying an answer time corresponding to the amount of time between presentation of the question and receiving the answer selection;
determining, regardless of a correctness of the answer, the test taker is guessing the answer to the question, wherein the determining comprises (i) comparing the answer time to a predetermined threshold answer time and (ii) ascertaining that the test taker is guessing when the answer time is outside the threshold answer time;
providing to the test taker, based upon the determining, one or more additional questions, wherein the one or more additional questions are related to the first question; and
evaluating the test taker using the answer selection and any test taker response to the one or more additional questions, thereby ascertaining the test taker understands a subject matter corresponding to the question, wherein the one or more additional questions are generated from at least one step of a logic used to answer the question, wherein the evaluating the one or more additional questions comprises comparing the test taker response to evaluation logic corresponding to the at least one step of the logic.

2. The method of claim 1, wherein the predetermined threshold answer time is based upon answer times collected from a plurality of users.

3. The method of claim 1, comprising assigning a confidence score to the determining if the test taker is guessing the answer to the question.

4. The method of claim 3, wherein the assigned confidence score is based upon comparing a behavior pattern of the test taker to behavior patterns of a plurality of groups of reference test takers, wherein the plurality of groups of reference test takers are grouped based upon test performance and wherein each group is assigned a confidence score.

5. The method of claim 3, wherein the one or more additional questions are selected based upon the assigned confidence score.

6. The method of claim 5, wherein the selected one or more additional questions comprise questions requiring more detail from the test taker when the assigned confidence score is above a predetermined threshold.

7. The method of claim 1, wherein the one or more additional questions comprise a question requiring an explanation of the answer selection.

8. The method of claim 7, comprising comparing a provided explanation of the answer selection to a previously stored explanation.

9. The method of claim 1, wherein, during subsequent questions on the multiple choice exam, the determining is based upon received input to the one or more additional questions.

10. The method of claim 1, comprising comparing the answer selection to a known answer.

11. An apparatus, comprising:
at least one processor; and
a computer readable storage medium having computer readable program code embodied therewith and executable by the at least one processor, the computer readable program code comprising:

computer readable program code that utilizes at least one processor to execute computer code that performs the steps of:

computer readable program code that obtains a first question on a multiple choice exam, wherein the first question comprises a plurality of possible answers;

computer readable program code that receives, from a test taker, his or her answer selection of one of the plurality of possible answers;

computer readable program code that identifies an answer time corresponding to the amount of time between presentation of the question and receiving the answer selection;

computer readable program code that determines, regardless of a correctness of the answer the test taker is guessing the answer to the question, wherein the determining comprises (i) comparing the answer time to a predetermined threshold answer time and (ii) ascertaining that the test taker is guessing when the answer time is outside the threshold answer time;

computer readable program code that provides to the test taker, based upon the determining, one or more additional questions, wherein the one or more additional questions are related to the first question; and computer readable program code that evaluates the test taker using the answer selection and any test taker response to the one or more additional questions, thereby ascertaining the test taker understands a subject matter corresponding to the question, wherein the one or more additional questions are generated from at least one step of a logic used to answer the question, wherein the evaluating the one or more additional questions comprises comparing the test taker response to evaluation logic corresponding to the at least one step of the logic.

12. A computer program product, comprising:

a computer readable storage medium having computer readable program code embodied therewith, the computer readable program code executable by a processor and comprising:

computer readable program code that utilizes at least one processor to execute computer code that performs the steps of:

computer readable program code that obtains a first question on a multiple choice exam, wherein the first question comprises a plurality of possible answers;

computer readable program code that receives, from a test taker, his or her answer selection of one of the plurality of possible answers;

computer readable program code that identifies an answer time corresponding to the amount of time between presentation of the question and receiving the answer selection;

computer readable program code that determines, regardless of a correctness of the answer, the test taker is guessing the answer to the question, wherein the determining comprises (i) comparing the answer time to a predetermined threshold answer time and (ii) ascertaining that the test taker is guessing when the answer time is outside the threshold answer time;

computer readable program code that provides to the test taker, based upon the determining, one or more additional questions, wherein the one or more additional questions are related to the first question; and computer readable program code that evaluates the test taker using the answer selection and any test taker response to the one or more additional questions, thereby ascertaining the test taker understands a subject matter corresponding to the question, wherein the one or more additional questions are generated from at least one step of a logic used to answer the question, wherein the evaluating the one or more additional questions comprises comparing the test taker response to evaluation logic corresponding to the at least one step of the logic.

13. The computer program product of claim 12, comprising assigning a confidence score to the determining if the test taker is guessing the answer to the question.

14. The computer program product of claim 13, wherein the assigned confidence score is based upon comparing a behavior pattern of the test taker to behavior patterns of a plurality of groups of reference test takers, wherein the plurality of groups of reference test takers are grouped based upon test performance and wherein each group is assigned a confidence score.

15. The computer program product of claim 13, wherein the one or more additional questions are selected based upon the assigned confidence score.

16. The computer program product of claim 15, wherein the selected one or more additional questions comprise questions requiring more detail from the test taker when the assigned confidence score is above a predetermined threshold.

17. The computer program product of claim 12, wherein the one or more additional questions comprise a question requiring an explanation of the answer selection.

18. The computer program product of claim 17, comprising comparing a provided explanation of the answer selection to a previously stored explanation.

19. The computer program product of claim 12, wherein, during subsequent questions on the multiple choice exam, the determining is based upon received input to the one or more additional questions.

20. A method, comprising:

utilizing at least one processor to execute computer code that performs the steps of:

receiving a first question from a multiple choice exam having a plurality of possible answers;

identifying an answer selected by a test taker for the question and measuring the time it takes for the test taker to answer the question after being presented the first question;

determining, regardless of a correctness of the answer, by comparing the time to a predetermined threshold time, whether to query the test taker with at least one additional question related to the first question;

prompting, based upon the answer time being outside the predetermined threshold, the test taker with the at least one additional question; and evaluating the test taker, wherein the evaluating the test taker comprises evaluating both the selected answer and a response provided by the test taker to the at least one additional question, thereby ascertaining the test taker understands a subject matter corresponding to the question, wherein the one or more additional questions are generated from at least one step of a logic used to answer the question, wherein the evaluating the one or more additional questions comprises comparing the response to evaluation logic corresponding to the at least one step of the logic.

* * * * *